June 2, 1970     S. DIX     3,515,840

DIODE SEALER

Filed Oct. 20, 1965     8 Sheets-Sheet 1

INVENTOR.
SYDNEY DIX
BY Smyth, Roston & Pavitt
ATTORNEYS.

Fig. 5

June 2, 1970  S. DIX  3,515,840
DIODE SEALER

Filed Oct. 20, 1965  8 Sheets-Sheet 5

INVENTOR:
Sydney Dix

United States Patent Office 3,515,840
Patented June 2, 1970

3,515,840
DIODE SEALER
Sydney Dix, Costa Mesa, Calif., assignor, by mesne assignments, to GTI Corporation, Providence, R.I., a corporation of Rhode Island
Continuation-in-part of application Ser. No. 454,850, May 11, 1965. This application Oct. 20, 1965, Ser. No. 506,428
Int. Cl. B23k 1/02, 1/12
U.S. Cl. 219—85
24 Claims

ABSTRACT OF THE DISCLOSURE

The present invention is directed to a means for sealing a plurality of individual devices at the same time and where each one of the individual devices includes at least portions to be sealed and specifically including a source of electrical energy which is coupled to a unitary heating element. The plurality of individual devices are arranged in a predetermined spatial pattern and the unitary heating element has a plurality of preformed openings arranged in the predetermined spatial pattern so that each device is at least partially surrounded by an opening. The electrical energy is then supplied to the heating element to produce heating energy at each preformed opening.

---

This is a continuation-in-part of application Ser. No. 454,850 filed May 11, 1965, now abandoned. This invention relates to an apparatus for producing heat to perform a particular operation on a plurality of individual devices arranged in predetermined spatial relationship. The present invention may also be used to produce heat to perform a particular operation on an individual device. For example, it is often difficult to produce a seal around the edge of a large flat pack integrated circuit. The present invention will produce a seal on such a structure and will accomplish the seal while maintaining particular atmospheric conditions. It is to be appreciated that the present invention may be used to provide many different functions. Although several of the described embodiments relate to the operation of the present invention as a diode sealer, the present invention may be used to seal other devices such as reed switches, transistors, or flat pack integrated circuits.

The present invention may also be used for brazing, soldering, alloying one material into the surface of a second material, molding, and for producing seals in other devices other than those mentioned above. The present invention may also be used to manufacture components for diodes, transistors, integrated circuits and other devices. The various aspects and uses of the invention will become clearer when the invention is described in greater detail with reference to the drawings.

One aspect of the present invention relates to a diode sealer which may be used to seal a great number of diodes, for example, 500 at the same time. The present invention is extremely reliable and seals this great number of diodes with a high yield. Also, the present invention is adaptable to automatic loading techniques and produces a seal in the individual diodes in a very short period of time compared to prior art devices. The combination of these above factors enables the apparatus of the present invention to reliably seal a large number of diodes per hour.

Prior art diode sealers are essentially of three types. The fiirst type individually seals a small number of diodes at the same time, for example, 5 diodes. This type of sealer uses individual heating coils surrounding each diode structure and the various components of the diode are loaded by hand into the sealing machine. A chamber is secured around the diodes to be sealed so that the diodes may be subjected to various atmospheric conditions before and during the sealing operation. This type of diode sealer is disclosed in U.S. Letters Patent No. 2,893,185.

The diode sealer disclosed in the above mentioned patent is extremely accurate and can be used to seal diodes under varying atmospheric conditions. However, this type of machine has two major faults. First, the machine is not amenable to automatic loading techniques, and secondly, since the machine seals a relatively small number of diodes at the same time, the machine produces a low number of sealed diodes per hour.

Since the number of diodes produced per hour is low, the machine cannot be used for low-grade, low-cost diodes, but this type of diode sealer is useful to accurately produce high-grade diodes.

A second type of diode sealer is used in the large production of facilities to produce low-grade, low-cost diodes. This is a very large automatic machine which seals a great number of diodes per hour. However, the machine seals each diode separately rather than sealing a plurality of diodes at the same time. The diodes are supported at circumferential positions at the periphery of a drum. The drum is revolved and individual operations are performed on the diodes to seal the diodes. This machine has two major difficulties. First, the yield from the machine is relatively low since a fairly high proportion of the diodes are rejects. Second, the diodes cannot be subjected to various atmospheric conditions before and during the sealing operation. These difficulties relegate this type of automatic machine for use with low-cost, low-quality diodes.

The third type of diode sealer uses a plurality of diodes mounted in a single holder. The diodes are then passed through an oven to seal the diodes. This type of diode sealer also has certain serious limitations. First, it is difficult to accurately maintain temperature control of an oven at all points within the oven. Therefore, it is very easy to subject some of the diodes to different temperatures than others of the diodes. The differing temperature conditions produces varying characteristics from each batch of diodes and if the temperature is high enough at any one position within the oven, some of the diodes may be ruined.

Changing the temperature within an oven is a relatively slow procedure, and it is impossible to bring the oven up to the proper temperature quickly. Also, it is difficult to control the temperature quickly at a particular value. Since the oven is slow in heating to a particular temperature, it would take an inordinate amount of time to heat the oven for each batch of diodes. Therefore, it is advisable to keep the oven at a constant temperature and to pass the diodes through the oven. This necessitates a fairly complex oven structure so that diodes can pass through the oven without large quantities of heat being lost from the oven. Another difficulty with an oven type of diode sealer is that the entire diode gets hot, including the semiconductor material, during the sealing operation. This could cause serious damage to the semiconductor material if the temperature is too high and since, as mentioned above, it is relatively difficult to maintain an accurate control of the temperature, a large percentage of the diodes could be destroyed. Lastly, the oven type of diode sealer is difficult to construct so that it can maintain both atmospheric and temperature conditions.

The present invention eliminates the above difficulties found in the prior art diode sealers. First, the present invention is amenable to automatic loading techniques. This is because the diode sealer of the present invention uses a work holder which contains a great number of diodes, for example, 500. The work holder may be automatically loaded using an automatic loader as shown in my copending application Ser. No. 303,015, filed on Aug. 19, 1963, and assigned to the assignee of the instant application. The work holder containing the unsealed diodes is then placed within a chamber which can be sealed. The chamber is used to produce the appropriate atmospheric conditions surrounding the diode both before and during the sealing process so as to insure proper operation of the diodes after sealing.

In the broadest aspect of the invention, a heating element has preformed areas conforming to the position of the plurality of diodes. This is accomplished, for example, by producing a plurality of openings in a plate which conform to a predetermined spatial relationship of the diodes as they are held by the work holder. The heating element surrounds the diodes at positions where the diodes are to be sealed. Electrical current is then passed through the heating element to produce a high temperature in the heating element due to the electrical resistivity of the heating element. The high temperature of the heating element produces heat waves and also a considerable quantity of infrared energy. The heat waves and infrared energy from the heating element are then transferred to the individual diodes at the preformed areas to seal the individual diodes. In one embodiment of the invention the heating element is a separate member which is placed adjacent to the work holder. In a second embodiment of the invention, the heating element is the same member as the work holder.

The heating element and associated components may also take many different configurations depending upon the particular heating operation to be performed and depending on the particular structure of the device on which the heating operation is performed. For example, other embodiments of the present invention use split heating elements to substantially enclose the device for a better distribution of heat, especially when the heating element is being used to produce two seals at the same time. It is often desirable to use a weight plate to maintain pressure between components during the heating operation. The present invention contemplates the passage of electrical current through this weight plate so as to insure that any expansion in the heating element during the heating operation is followed by a complementary expansion in the weight plate. The equal expansion of the heating element and the weight plate eliminates the possibility of relative movement between the weight plate and the device to which the heat is applied.

The present invention also contemplates the use of a bus bar mounted on the heating element so as to provide a uniform distribution of electrical current through the heating element. The uniform distribution of the electrical current through the heating element produces a uniform heating operation on the plurality of individual devices which are arranged in the predetermined spatial pattern. Other embodiments of the invention contemplate the use of heat sinks so as to maintain a relatively low temperature within a portion of the device to which the heat is applied. For example it is often desirable when sealing diodes to maintain the semiconductor material within the diode at a temperature lower than the temperature necessary to produce the seal. The use of the heat sink can maintain the temperature of the semiconductor material below the sealing temperature.

The present invention accomplishes the heating operation in the individual devices by first passing a current through the heating element. The heating element is then heated due to its electrical resistance, to a considerable temperature. The heating element then not only radiates heat waves but the heating element also produces a considerable amount of infrared energy. The combination of the heat waves and the infrared energy performs the heating operation in the individual devices.

The use of infrared energy is desirable because infrared energy has certain advantages over heat waves. For example the infrared energy is an electromagnetic radiation and is generated by vibration and rotation of the atoms and molecules within any material whose temperature is above absolute zero. The infrared energy travels in straight lines outward from the source and is propagated in a vacuum as well as in physical mediums such as air gases, liquids or solids. Since the infrared energy is not transmitted by thermal convection or conduction in a physical medium, it is independent of the atmosphere surrounding it. The infrared energy, therefore, is efficiently distributed to the individual devices to be heated and is not dependent upon the atmosphere within the chamber.

The infrared energy generates heat in the individual devices which lie in its path since the infrared energy causes vibrations or rotations within the atomic structure of the individual devices. The infrared energy, therefore, penetrates into the individual devices and is more efficient in producing heat within the individual devices than the heat waves. The use of the infrared energy in addition to the heat waves lowers the temperature at which, for example, a diode may be sealed. This lowering of the sealing temperature results from the penetration and more efficient operation of the infrared energy in the production of heat within the diode. In addition, many of the materials which are used in sealing diodes are responsive to infrared energy. Further, the diode may be constructed of a material which is particularly receptive to infrared energy so as to further reduce the temperature at which the diode may be sealed. It is to be appreciated that other devices such as transistors, integrated circuits, etc., are also sealed at lower temperatures due to the use of the infrared energy.

The diode sealer of the present invention has several very important advantages. First, the diode sealer accomplishes the sealing operation very quickly since the heating element, for example, a graphite plate, can be brought up to a high temperature very quickly by passing the electrical current through the heating element. Since the sealing is accomplished within a very short period of time, the diode is not subjected to high temperatures over long periods of time which may damage or destroy the semiconductor material. Also, it is possible with the diode sealer of the present invention to selectively localize the application of heat, or to use heat sink techniques as described above, so as to further protect the semiconductor material.

In addition to the above, the diode sealer of the present invention is very amenable for use within an atmospheric chamber. This is true since the chamber does not have to perform any heating functions but merely has to operate as a standard atmospheric chamber. Since the present invention may be operated in an atmospheric chamber, it is possible to perform the heating or sealing operation while under pressure or while under a selected atmospheric condition. This may be advantageous since it is then possible, for example, to seal the diode or other device while in the environment of an inert gas. The use of an inert gas insures both longer life and more accurate and reliable response for the individual device. The invention, therefore, contemplates sealing or heating in the presence of a controlled atmosphere such as an inert gas. Another aspect of the invention is in the introduction of an increased pressure at a particular point in the sealing cycle. The use of the increased pressure promotes a tighter seal since the increased pressure squeezes the components together during the sealing operation.

It is to be appreciated that, although the invention is described with particular reference to a diode sealer, the particular sealing techniques and apparatus disclosed in the present application may be used for any operation as described above where it is desired to perform a desired heating operation on a plurality of elements at the same time. For example, the apparatus of the present invention could be used to produce a first seal in a plurality of diodes in addition to the production of a final seal as described in this application. Also, the invention could be used to perform various operations such as brazing, soldering, molding or alloying, or the invention may be used to seal other types of devices such as reed switches or semiconductor devices such as transistors or integrated circuits. In addition, the invention may be used to manufacture components for any of the above-mentioned devices.

A clearer understanding of the invention generally and with particular application to diode sealing will be had with reference to the drawings wherein:

FIG. 6a is a detailed cross-sectional view of the particular structure of the heating element in conjunction with the individual device to be sealed as shown in FIG. 6;

FIG. 6b is an alternative embodiment to the structure of FIG. 6a;

FIG. 7 is a front perspective view of a second embodiment of a diode sealer or the like showing the atmospheric chamber with its door in the closed position and illustrating the control panel;

Figure 1:
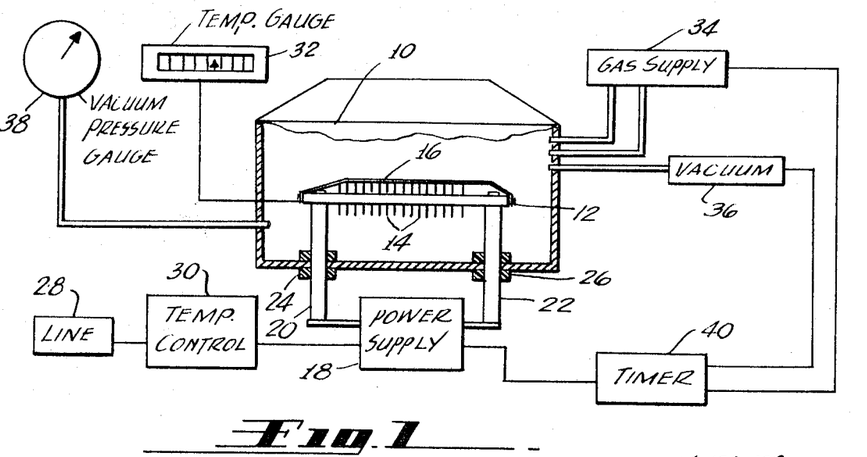
FIG. 1 is a block diagram of a first embodiment of a system used in conjunction with a diode sealer of the present invention.

In FIG. 1, an atmospheric chamber 10 has a combination heating element and work holder 12 supported within the chamber 10. The heating element 12 supports a plurality of diodes 14 and the diodes are weighted down by weight plate 16. The heating element 12 is supplied with electrical current from the power supply 18 through the electrical connectors 20 and 22. The electrical connectors 20 and 22 are insulated from the atmospheric chamber 10 by the insulating support members 24 and 26.

AC power is taken from the line 28 and applied through a temperature controller 30 to the power supply 18. The temperature controller may be, for example, a rheostat to control the amount of current applied to the power supply. When current flows through the heating element 12 it emits heat waves and infrared energy and the temperature of the heating element 12 is monitored by the temperature gauge 32. During the operation of the diode sealer of FIG. 1, the atmospheric chamber 10 is supplied and exhausted at various times with inert gas by a gas supply 34. At other times during the operation of the diode sealer a vacuum is applied to the atmospheric chamber by the vacuum means 36. The vacuum or pressure within the atmospheric chamber 10 is monitored by vacuum-pressure gauge 38. The power supply 18, gas supply 34 and vacuum 36 are all controlled as to their time sequence during the operation of the diode sealer by the timer 40.

A typical cycle for sealing a batch of diodes consists of the following operations: The heating element 12 supporting the diodes 14 is placed within the atmospheric chamber 10 and attached to the electrical connectors 20 and 22. The temperature gauge is connected to the work holder 12. The atmospheric chamber 10 is closed so as to seal off the chamber. The diode sealer is now ready to operate and the timer 40 is initiated. The gas supply 34 is turned on to purge the atmospheric chamber 10 by introducing an inert gas within the chamber and by having that inert gas freely flowing out of the chamber until the chamber contains nothing but the inert gas. In order to be positive that all extraneous gases are removed from the chamber 10, a vacuum is applied to the chamber by vacuum means 36 to remove all gases from the chamber 10. The timer 40 now controls the gas supply 34 to once more introduce an inert gas from the gas supply to the chamber 10 so as to create a pressure within the chamber 10. Depending upon the particular diodes to be sealed and the amount of pressure desired, the chamber may contain inert gas from one atmosphere of pressure up to many atmospheres of pressure.

Timer 40 now controls the power supply 18 to supply electrical current to flow through the heating element 12. The temperature of the heating element 12 is monitored by the temperature gauge 32, and the temperature controller 30 is varied to control the temperature of the heating element by indirectly controlling the amount of electrical current through the heating element. The actual amount of time that the current must flow through the heating element 12 is relatively short. For example, the heating element can be made of graphite, carbon, metal and combinations of these and can be constructed to hold 500 diodes and the sealing can be accomplished by bringing the temperature up to approximately 900° C. by passing current through the heating element 12 for 15 seconds. The current can now be discontinued and after a very short period of time, for example, 5 seconds, the gases within the chamber 10, which have been heated, can be released to the atmosphere. In addition, cooling gas can be introduced by the gas supply 34 to cool the heating element 12 down to room temperature within 2 minutes.

Using a diode sealer as shown in FIG. 1, 500 diodes or more may be sealed at the same time with very high accuracy, very high yield and within a relatively short period of time. This is a substantial improvement over the prior art devices which require a significantly longer period of time in which to seal a similar amount of diodes. Moreover, the atmospheric conditions within the chamber 10 can be accurately controlled, which is an advantage over many of the prior art devices.

Figure 2:
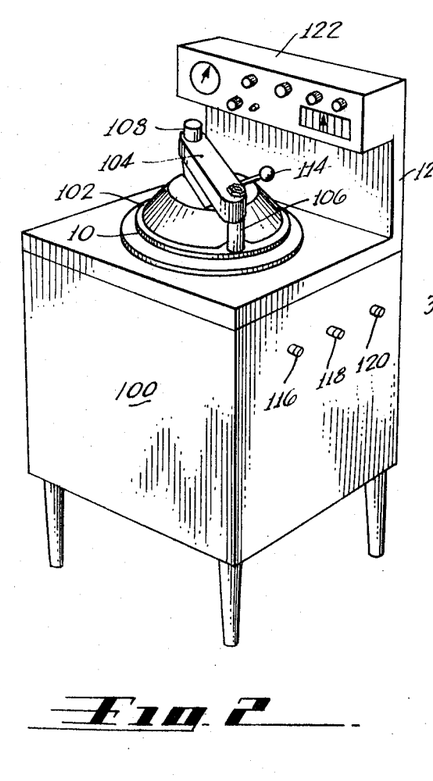
FIG. 2 is a front perspective view of a first embodiment of a diode sealer or the like showing the atmospheric chamber with its door in the closed position.
Figure 3:
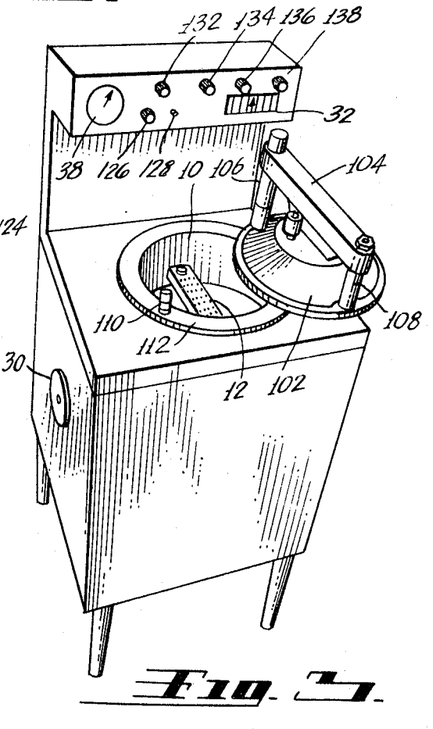
FIG. 3 is a perspective view from above of the diode sealer of FIG. 2 illustrating the atmospheric chamber with its door in an open position and showing the placement of the heating element within the atmospheric chamber.

In FIGS. 2 and 3, two perspective views of a diode sealer constructed in accordance with the diagram of FIG. 1 are shown. Items which are identical to those shown in FIG. 1 are given the same reference characters. The various components of the diode sealer constructed in accordance with the invention are shown encased in a cabinet 100. The atmospheric chamber 10 is recessed within the top portion of the cabinet 100. A cover 102 for the chamber 10 is supported on an arm 104. The arm 104 swivels about a fixed post 106 and has a second post 108 which is adapted to lock onto member 110.

In FIG. 3, the heating element 12 is shown supported within the chamber 10. During a sealing operation, the cover 102 is swiveled about post 106 until post 108 engages member 110. The cover 102 is then forcibly lowered against a lip 112 of the chamber 10 to seal off the chamber from the atmosphere. The movement of the cover 102 is accomplished through a mechanism controlled by a lever arm 114.

The right side of the cabinet 100 contains the connectors for the vacuum and gas supply. A connector 116 is used to connect up to the vacuum means 36, shown in FIG. 1, and connectors 118 and 120 are used to connect up to the gas supply 34, also shown in FIG. 1. Connector 118 is used to provide an exhaust of the inert gas and connector 120 is used to provide the supply of the inert gas. During the purge portion of a sealing cycle, inert gas is both supplied and exhausted through connectors 118 and 120, while during the pressure portion of the sealing cycle inert gas is supplied through connector 120.

A control panel 122 is shown supported at the back of the cabinet 100 through a support column 124. The control panel contains the pressure vacuum gauge 38 and the temperature gauge 32, both shown in FIG. 1. In addition, the control panel contains a fuse 126, an on-off switch 128, and four indicator lights 132, 134, 136 and 138. The indicator lights are used during a sealing operation and provide a visual indication as to what operation is being performed within the diode sealer. For example, indicator light 132 is used to indicate that the diode sealer is at the purge portion of the sealing cycle. Indicator light 134 is used to indicate that the diode sealer is at the vacuum portion of the sealing cycle. Indicator light 136 is used to indicate that the diode sealer is at the pressure portion of the sealing cycle, and finally, indicator light 138 is used to indicate that the diode sealer is at the sealing portion of the cycle.

During the operation of the diode sealer, the temperature of the heating element 12 is monitored by the temperature gauge 32. If the temperature is in error, it may be corrected by varying the current through the heating element 12. The current is varied by the temperature control means 30 shown in FIG. 3 on the left-hand side of the cabinet 100.

Figure 4:
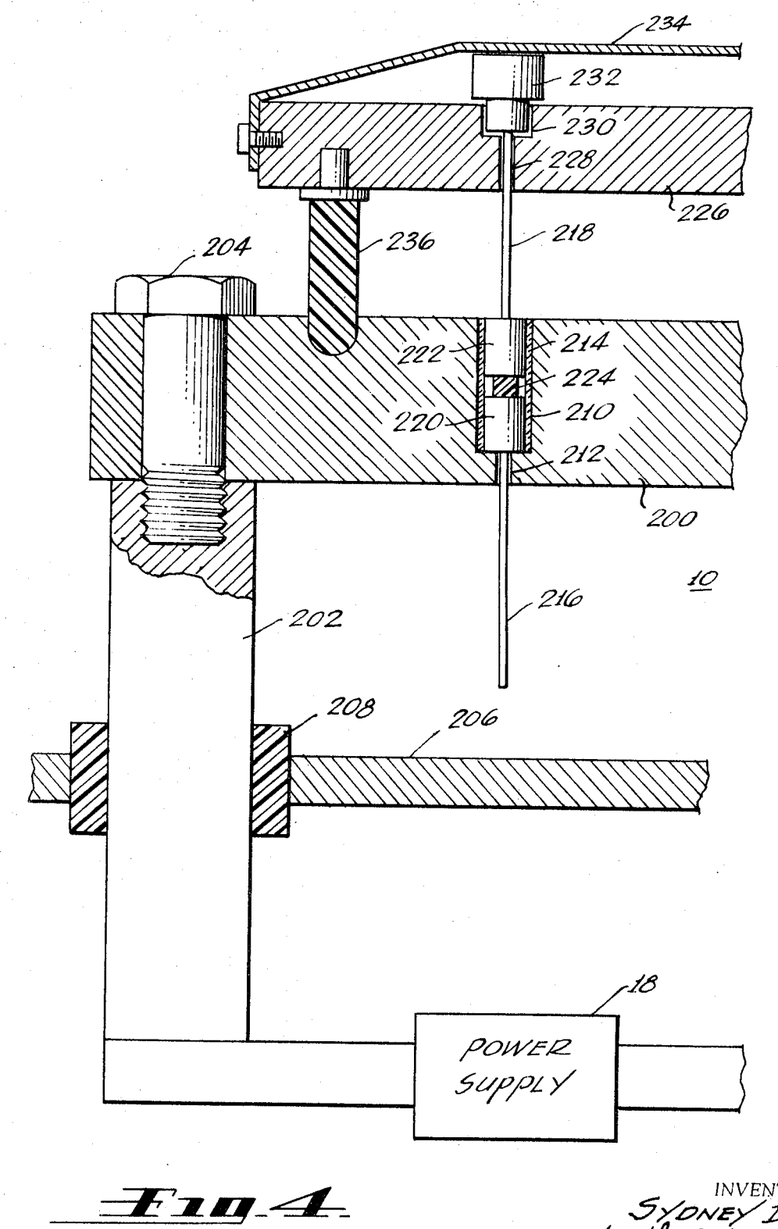
FIG. 4 is one embodiment of a heating element wherein the heating element operates as both a heating element and a work holder.

FIG. 4 illustrates a detailed portion of a first embodiment of a heating element which is used to provide a dual function as both heating element and work holder. The heating element is constructed of a plate 200 which, for example, may be composed of graphite, carbon, metal or combinations of these. The plate 200 is supported within the chamber 10 by a post 202 which also operates as a bus bar. The plate 200 is securely connected to the post 202 through the use of a bolt 204. The bus bar 202 passes through the bottom wall 206 of the chamber 10. The bus bar is insulated from and sealed to the bottom wall 206 by an insulating collar 208. The bus bar 202 is then conected to the power supply 18. It is to be appreciated that FIG. 4 merely illustrates one end of the heating element and that the other end of the heating element and the supporting structure is identical to that illustrated in FIG. 4.

Plate 200 has a plurality of openings disposed through the plate. For purposes of illustration, only one opening is shown. In the embodiment of FIG. 4, the opening consists of a first portion 210 which does not extend completely through the plate. A second portion of the opening 212 extends from the bottom wall of the portion 210 and continues through the plate 200. It is to be appreciated that the two portions 210 and 212 of the openings are designed specifically to support a particular size and type of diode and that other configurations may be used.

As illustrated in FIG. 4, the diode to be sealed includes a tubular outer member 214. The member 214 usually would be constructed of glass. Two leads 216 and 218 extend within the tubular member 214 and the leads 216 and 218 are terminated by studs 220 and 222. The studs 220 and 222 are adapted to fit fairly closely within the tubular member 214. Also, the tubular member 214 is adapted to fit closely within the opening 210 and lead 216 is adapted to fit through the opening 212. However, the stud 220 is too large to fit through the opening 212 so that the stud 220 is supported by the bottom wall of the portion 210. A piece of semiconductor material 224 is placed within the tubular member 212 and is disposed between the two studs 220 and 222.

In order to insure a proper electrical contact between the studs 220 and 222 and the semiconductor material 224, a weight plate mechanism is arranged above the plate 200 to create a constant weight on the lead 218. Again it is to be appreciated that a single weighting member is shown but that a plurality of these weights are disposed within the weight plate. The weight plate consists of a first plate member 226 which has a first opening 228 which is adapted to receive lead 218. The opening 228 does not extend completely through the plate 226 but a larger opening 230 completes the extension through the plate 226. A weight member 232 sits above the plate 226 and pushes down on the top portion of the lead 218. A covering member 234 is used to maintain the weight 232 in its proper position and does not allow the weight to fall out of the opening 230. The entire weight plate is maintained a predetermined distance above the heating plate 200 by pins 236. These pins are made from insulating material so that electrical current does not pass between the plates 200 and 226.

As current is passed through the conductor 202 from the power supply 18, this current is then transmitted down the plate 200. A conversion of the electrical current to heat waves occurs due to the electrical resistance of the plate 200 and when the temperature of the plate is sufficiently high it radiates considerable infrared energy due to the vibration and rotation of the atoms and molecules within the plate. The particular temperature of the plate 200 and the speed at which the temperature is reached can be varied by changing the composition or configuration of the plate and by varying the electrical current.

The heat waves and infrared energy that are produced from the plate 200 surrounds the diode at the opening 210. The heat waves and infrared energy, however, are localized initially in the tubular member 214 since this member is at the closest position to the plate 200. The tubular member 214, being made of glass, melts and seals to the studs 220 and 222. The plate 200 heats up very rapidly and since the tubular member 214 is adjacent to the plate 200, the heat waves and infrared energy are transferred to the tubular member 214 rapidly. Current, therefore, need only be applied to the plate 200 for a relatively short period of time. For example, the temperature of a graphite plate containing 500 diodes could be heated to 900° C. by passing current through the plate 200 for 15 seconds. The power consumption of the diode sealer of the present invention is, therefore, relatively low.

Since the sealing is accomplished rapidly there is no opportunity for the heat in the diode produced by the plate 200 to penetrate to the semiconductor material 224. Moreover, the stud elements 220 and 222 being disposed against the semiconductor act as heat sinks for any heat which would be conducted to the semiconductor material 224.

Figure 5:
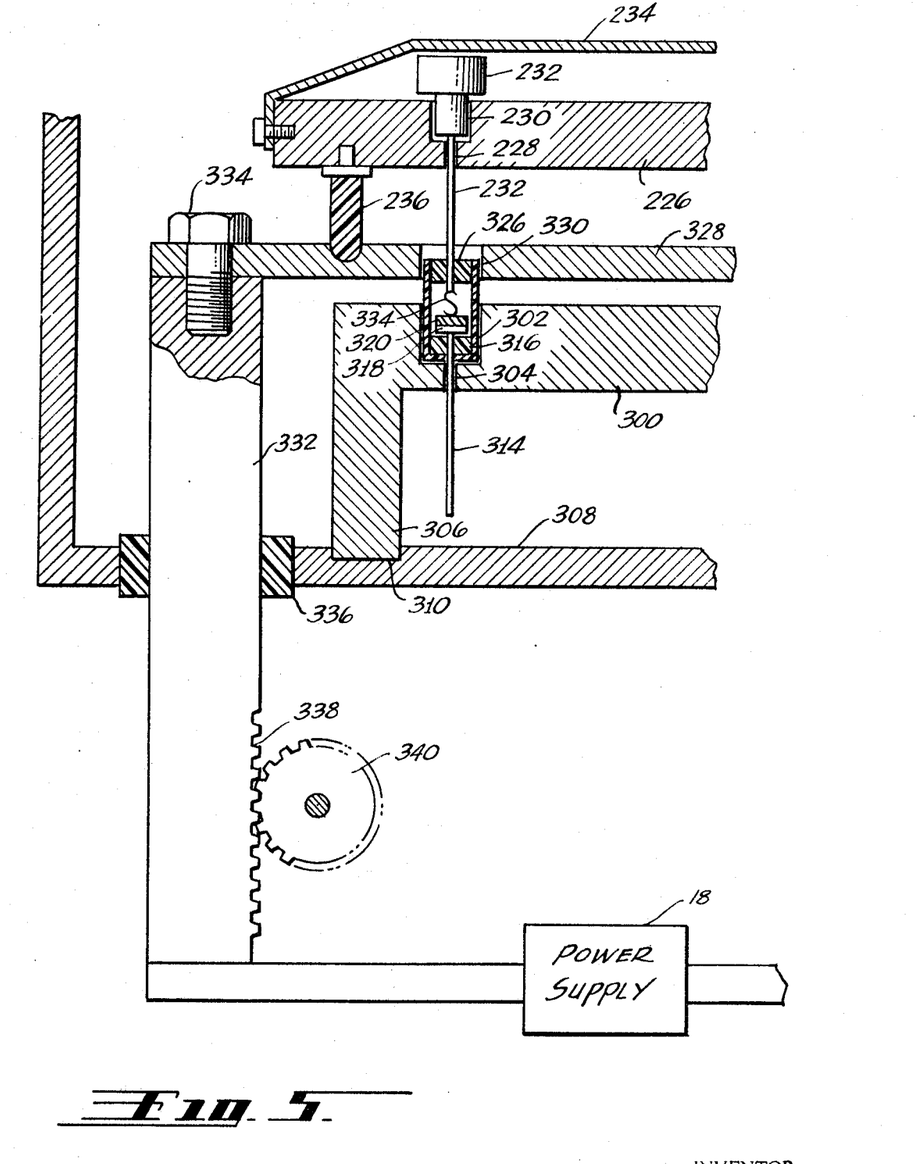
FIG. 5 is a second embodiment of a heating element wherein the heating element is independent of the work holder.

FIG. 5 illustrates a detailed portion of a second embodiment of the heating element which is separate and distinct from the work holder. A work holder 300 has a first portion 302 of an opening which does not completely extend through the holder 300. A second portion 304 of the opening extends from the bottom wall of the first portion 302 and through the plate 300. A leg member 306 supports the work holder 300 above the floor 308 of the atmospheric chamber. A slot 310 is cut into the floor 308 in order to receive and accurately position the leg 306. The slot 310 insures the accurate positioning of the work holder 300 within the atmospheric chamber.

A diode is supported by the work holder 300. The diode includes a tubular member 312 which is composed of, for example, glass. A lead member 314 is sealed to the bottom of the tubular member 312 through a sealing bead 316. The top surface of the lead 314 flares out into a stud 318 which supports a piece of semiconductor material 320. A second lead 322 terminates in an S-shaped piece of resilient material 324 which is used to make contact with the semiconductor material 320. A bead of insulating material 326 surrounds the lead 322 and the sealing is accomplished in the diode by sealing between the tubular member 312 and the bead 326.

A weight plate 226 is held above the diode by an insulating pin 236 in the same manner as that shown in FIG. 4. The weight plate shown in FIG. 5 is substantially identical to the one shown in FIG. 4 and the same reference characters are used. The weight plate is used to provide downward pressure on the lead 322 in order to insure a positive contact between the resilient member 324 and the semiconductor material 320.

Intermediate the weight plate 326 and the work holder 300 is a heating element 328. The heating element is in the form of a unitary plate which contains a plurality of openings 330, each opening adapted to surround a diode. As with FIG. 4, FIG. 5 merely illustrates a single opening. The heating element 328 of FIG. 5 is relatively simple since the openings 330 are merely a plurality of single-diameter holes through the plate 328. The plate 328 is supported on a post 332 which also serves as a bus bar and the plate 328 is connected to the bus bar 332 through a bolt member 334. The bus bar 332 is disposed through the bottom wall of the chamber 308 and is supported and sealed by an insulating member 336.

The bus bar 332 may be raised or lowered using a rack 338 and an associated pinion 340. The use of the rack and pinion facilitates the placement of the work holder 300 within the atmospheric chamber. The heating element 328 is first raised to its highest position and the work holder 300 is positioned within the chamber through the use of slot 310. After the work holder 300 is properly positioned, the rack and pinion is again operated to lower the heating element 328 until the heating element 328 is in the position shown in FIG. 5.

It is also to be appreciated that the heating element 328 may remain stationary and means may be provided to raise and lower the work holder 300. Also, the rack and pinion may be operated during the sealing portion of the cycle so that the diodes pass through the heating element 328 as electrical current flows through the heating element. In this way, it is possible to preheat the heating element 328 and then pass the diode through the preheated heating element to insure that the semiconductor material 320 is subjected to the heat waves and infrared energy for the shortest possible period of time.

In the embodiment of FIG. 5, heat waves and infrared energy are produced from the heating element 328 when electrical current passes through the heating element. The heat waves and infrared energy produced by the heating element 328 are then transferred to the outer surface of the diode and, in particular, are transferred to the tubular member 312 and the bead 326. When the temperature is high enough, the tubular member 312 and the bead 326 melt and fuse together to produce a sealed diode structure.

It can be seen from the above description of the invention that the diode sealer of the present invpention can seal a great number of diodes at the same time. In addition, the diodes may be subjected to various atmospheric conditions before, during and after the sealing operation in order to insure the accuracy of the diodes. Since the diodes are loaded onto the work holders which are amenable to automatic loading, a great deal of manual labor can be eliminated in order to cut costs. All of the above factors illustrate that the diode sealer of the present invention can accurately produce larger quantities of high-quality diodes than the prior art devices.

It is to be appreciated that the invention has been disclosed with reference to the sealing of diodes. However, it is to be understood that the invention may be used to seal other devices. For example, other semiconductor devices such as transistors and integrated circuits may be sealed by adapting the configuration of the openings through heating elements so as to conform to the shape of the particular device to be sealed.

In addition, the invention does not necessarily have to be used for sealing. The invention is also adaptable to other operations which require the application of heat. In particular, the invention is adaptable to produce heat to perform a particular operation in a plurality of identical devices at the same time.

For example, the invention may be used to solder two elements such as the soldering of a piece of semiconductor material to one lead of a diode. In FIG. 5, the semiconductor material 320 is shown already soldered to the stud portion 318 of the lead 314. The particular soldering operation was performed at an earlier time by heating and melting a solder preform which has been placed between the semiconductor material and the lead. It is obvious that the apparatus of the present invention could be adapted to produce this operation, for example, by using a heating element 200 as shown in FIG. 4.

The various components used are the outer tubular member 312, the lead 314, the semiconductor 320 and a solder preform which fits between the semiconductor 320 and the lead 314. These components are placed within the plate 200 and electrical current is passed through the plate 200 to melt the solder preform to bond the semiconductor 320 to the stud 318. Also, it is obvious that the operation of sealing the lead 314 to the tubular member 312 may be accomplished by using a heating element 200 as shown in FIG. 4.

Figure 6:
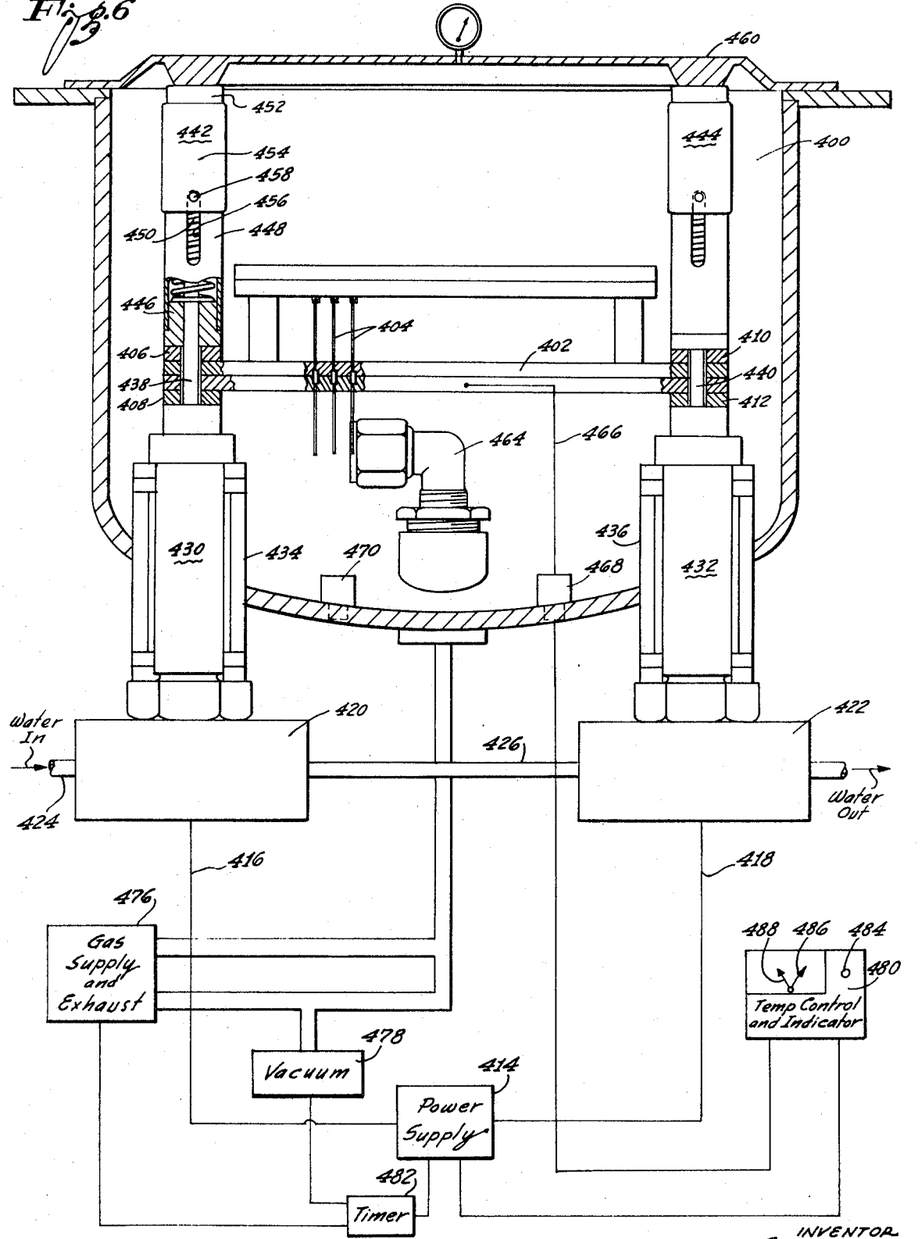
FIG. 6 is a block diagram of a second embodiment of a system used in conjunction with the present invention.

In FIG. 6, an atmospheric chamber 400 has a split heating element 402 supported within the chamber 400. The split heating element 402 supports a plurality of diodes 404. The split heating element 402 may be made of a material such as graphite and includes at its ends a plurality of bus bars 406 through 412. The bus bars 406 through 412 extend transversely across the ends of the split heating element 402 and provide a uniform distribution of electric current through the split heating element 402. The heating element 402 is supplied with electric current from a power supply 414 through electrical connectors 416 and 418.

The electrical conductors 416 and 418 are water cooled by a pair of cooling chambers 420 and 422. Since the electrical conductors 416 and 418 conduct large quantities of electrical current, the cooling chambers 420 and 422 prevent a large radiation of heat waves from the electrical conductors 416 and 418. Water is supplied to, circulated between and carried away from cooling chambers 420 and 422 by a plurality of pipes 424, 426 and 428.

The ends of the conductors 416 and 418 are connected to a pair of electrodes 430 and 432 which pass through the wall of the atmospheric chamber 400. The electrodes 430 and 432 are insulated from the wall of the chamber 400 by insulating members 434 and 436. The top portions of the electrodes 430 and 432 are stepped down to match the bus bars 408 and 412 and the electrodes additionally include rod members 438 and 440 which extend through openings in the bus bars and in the split heating element 402. As can be seen in FIG. 6, the electrodes 430 and 432 are permanently in position and the split heating element and associated components are positioned within the chamber 400 by sliding the openings in the bus bars and split heating element over the rod elements 438 and 440.

The split heating element 402 and the electrodes 430 and 432 are maintained in good electrical connection using the spring contact members 442 and 444. As illustrated by the partially broken away portion of member 442, the spring contact members include a conductive end portion 446 which has an opening to receive the rod element 438. An outer shell 448 encloses a spring member 450 which extends upward to contact an insulating member 452. An outer member 454 maintains the insulator 452 in position and operates as a stop through the use of the slot 456 and the pin 458.

The spring contact members 442 and 444 are designed to slightly extend past the top of the chamber 400 when the chamber is open. The chamber 400 is sealed by positioning a chamber door 460 over the chamber opening and by compressing the chamber door down so as to create a seal. As the chamber 400 is sealed, the spring contact members 442 and 444 are also compressed through the pressure of the door 460 on the insulating members such as insulating member 452. The pressure on the spring contact members creates a good contact between the electrodes 430 and 432 and the split heating element 402.

Figure 8:
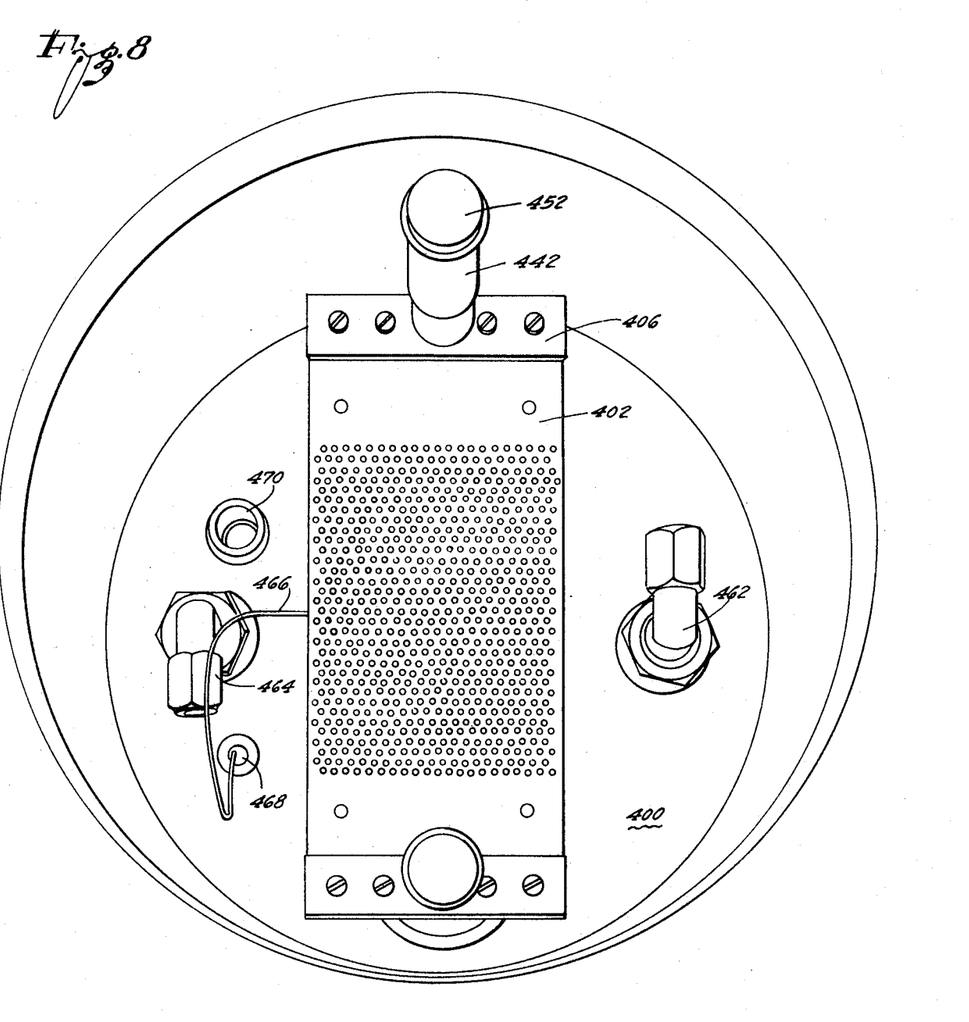
FIG. 8 is a top view of the diode sealer of FIG. 7 looking into the atmospheric chamber.

In FIG. 8, a top view looking into the chamber 400 is shown. As can be seen in FIG. 8, the chamber includes a pair of port assemblies 462 and 464 which allow for the production of the various atmospheric conditions which may be contained within the chamber 400. A thermocouple 466 extends through a sealed opening 468 in the wall of the chamber 400 and is connected to the split heating element 402 so as to measure the temperature of the split heating element. The wall of the atmospheric chamber 400 also includes a safety or relief valve 470 so as to allow the exit of any gases if the pressure within the chamber exceeds a safe value.

Figures 6A, 6B, 7:
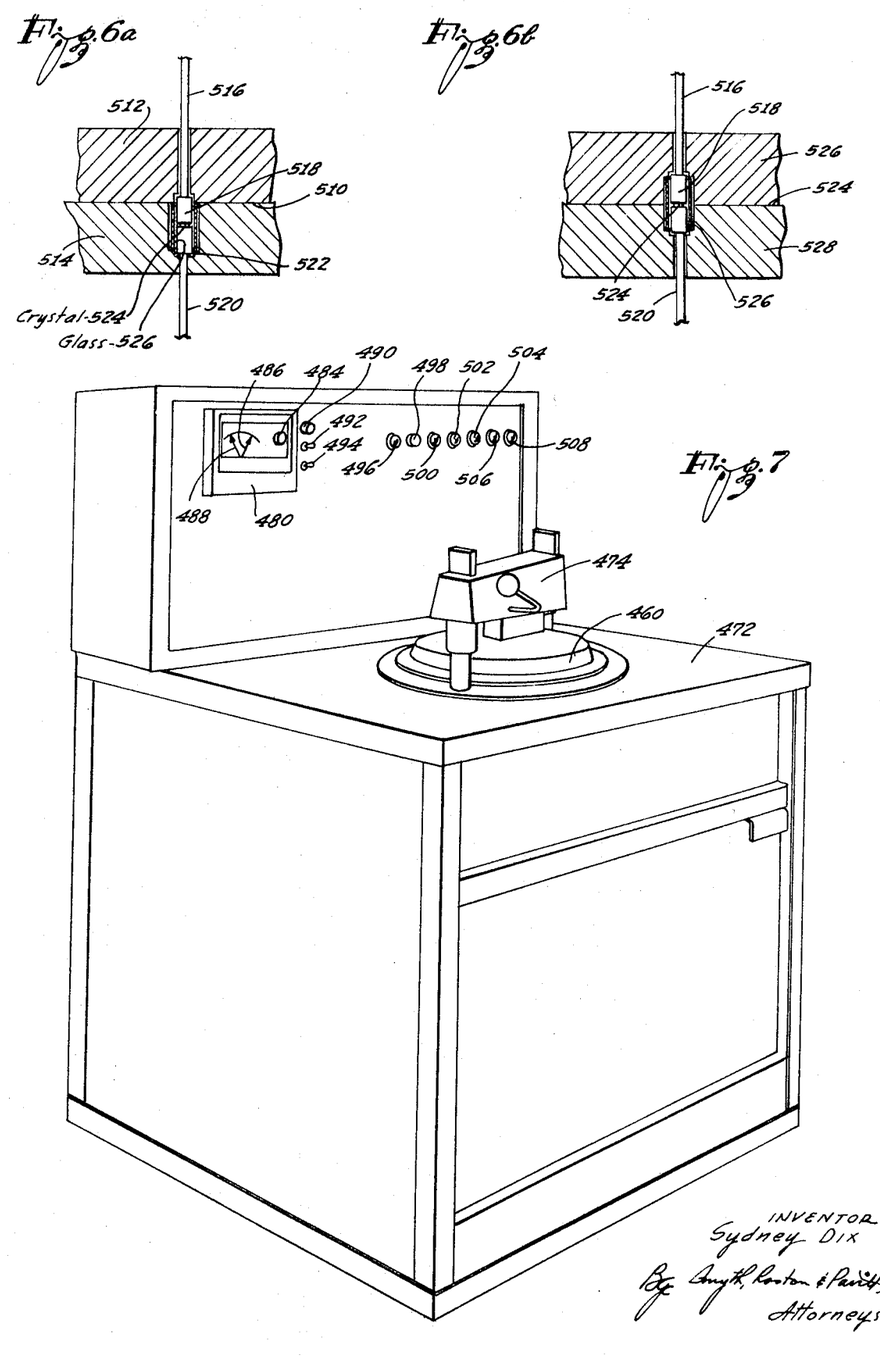

FIG. 7 illustrates the chamber 400 enclosed in a cabinet 472 and shows the cover 460 in a closed position so as to seal off the chamber. The cover 460 includes a mechanism 474 for creating a downward pressure to produce the seal which is similar to the mechanism shown in FIGS. 2 and 3.

In FIG. 6, a gas supply and exhaust 476 is shown connected to the ports 462 and 464 through a network of tubing. A vacuum pump 478 is also shown connected on one of the ports through the tubing. The thermocouple 466 is electrically connected to a temperature control and indicator 480 which, in turn, controls the power supply. Finally, a timer 482 is electrically connected to the gas supply and exhaust, the vacuum pump and the power supply so as to properly sequentially control the operation of these devices.

It is to be appreciated that the gas supply and exhaust 476, the vacuum pump 478, the power supply 414, the temperature control and indicator 480 and the timer 482 may all be conventional devices. For example, the temperature control and indicator may be a unit similar to a household thermostat which maintains a particular temperature which has been previously set to a desired value. For example, a control knob 484 adjusts the position of a setting indicator 486. The adjustment of the knob 484 sets the desired temperature to be maintained as shown by the indicator 486. The temperature of the heating element 402, as monitored by the thermocouple 466, is represented by an indicator 488. When the indicator 488 reaches the desired temperature, which is represented by an overlay of the indicators 486 and 488, the power supply 414 is switched off. The power supply 414 is alternatively switched on and off to maintain the desired temperature in the heating element 402.

As shown in FIG. 7, the control panel mounted on the cabinet 472 additionally includes an overload fuse 490, an on-off switch 492 and a start switch 494. Also, a plurality of indicator lights are mounted on the control panel and are connected so as to light up in response to particular conditions within the atmospheric chamber. For example, the lights which are numbered from 496 through 508 may indicate the following conditions within the atmospheric chamber during a particular sealing cycle: Indicator light 496 is on during the purge portion of the cycle; indicator light 498 is on during the vacuum portion of the cycle; indicator light 500 is on during the pressurize portion of the cycle; indicator light 502 is on during the heating portion of the cycle; indicator light 504 is on during the pressure differential portion of the cycle; indicator light 506 is on during the cooling portion of the cycle, and, finally, indicator light 508 is on when any of the other indicators are on so as to provide a warning not to open the atmospheric chamber.

A typical cycle for the operation of the apparatus of FIGS. 6 through 8 as a diode sealer includes the following steps: The diode components are mounted in the heating element 402 with its associated apparatus, and the heating element 402 is slipped over the rods 438 and 440. The spring contact members 442 and 444 are also positioned over the rods 438 and 440. The door 460 of the chamber 400 is then positioned over the chamber 400 and forced downward using the mechanism 474. The downward movement of the door 460 also spring loads the spring contact members 442 and 444 downward to insure a good electrical contact between the heating element 402 and the electrodes 430 and 432. The on-off switch 492 is then turned on so as to connect the apparatus to a supply source of electrical energy. The actual sealing cycle, however, is not initiated until start switch 494 is pushed so as to energize the timer 482.

The timer 482 controls the sequential operation of the various components of the diode sealer of FIG. 6. The timer 482 first controls the gas supply and exhaust 476 to purge the chamber 400. The purge is accomplished by cycling a gas such as dry nitrogen through the chamber 400 so as to remove the atmosphere that was enclosed in the chamber when the cover 460 was closed. The cycling of dry nitrogen purges the chamber 400 of substantially all contaminants. Next, the timer 482 controls the vacuum pump 478 so as to exhaust the chamber 400 and remove both the dry nitrogen and any remaining contaminants.

The timer 482 now controls the gas supply and exhaust 476 to pressurize the chamber 400 with an inert gas from 1 to 2 atmospheres. When the diodes are sealed, they will contain an inert gas so as to substantially increase the life and improve the accuracy of the diodes. Next, the timer 482 controls the power supply 414 to send current to the heating element 402. The heating element 402 gradually heats up to the desired temperature. For example, sufficient current may be sent through the heating element 402 so as to raise the temperature of the heating element to 900° C. within one minute. The desired temperature for the heating element is adjusted by the knob 484 which controls the setting indicator 486.

As the temperature within the heating element 402 increases, the thermocouple 466 monitors the temperature and an indication of the temperature is provided by the indicator 488 of the temperature control and indicator 480. When the temperature of the heating element 402 reaches the desired temperature, the temperature control and indicator 480 controls the power supply 414 so as to maintain the temperature of the heating element 402 at the desired value. The control of the temperature of the heating element 402 may be maintained within an accuracy of ±1° C.

After the heating element 402 reaches the desired temperature and is maintained at that temperature for a particular period of time so as to initiate a seal in the diodes, the timer 482 may control the gas supply and exhaust 476 so as to increase the pressure of the inert gas in the chamber 400. The pressure may be increased to, for example, 5 atmospheres, so as to squeeze together the portions of the diode to be sealed and to eliminate the possibility of leakage in the diodes at some future time. The increase in pressure may be characterized as a pressure differential and the pressure differential is maintained for a particular period of time.

The timer 482 now turns off the current to the heating element 402 and then the timer 482 controls the gas supply and exhaust 476 to run a cooling gas, such as dry nitrogen, through the chamber 400. The cooling gas runs through the chamber for a particular period of time, for example, 5 minutes, so as to cool the heating element 402 for removal from the chamber. The time of an entire cycle for sealing a batch of diodes may be approximately 9 minutes but the time that current is supplied to the heating element 402 constitutes a fraction of the total time.

FIGS. 6a and 6b illustrate two alternative forms for a split heating element which may be used for the heating element 402 of FIG. 6. In FIG. 6a a split heating element 510 includes an upper member 512 and a lower member 514. The heating element 510 is designed to produce a double seal in a diode which includes an upper lead 516, which has been previously brazed to a stud 518, and a lower lead 520 which has been previously brazed to a second stud 522. A piece of semiconductor material 524 is sandwiched between the studs 518 and 522. The heating element 510 is designed to seal a glass tube 526 to the studs 518 and 522 so as to encapsulate the diode. The heating element 510 of FIG. 6a is similar to the heating element 200 of FIG. 4 except that the heating element 510 includes the upper member 512. The upper member 512 provides distribution of heat to the upper seal between the glass tube 526 and the stud 518 so as to lower the temperature differential between the upper and lower seals.

In FIG. 6b, a split heating element 524 is composed of upper and lower members 526 and 528. The heating element 524 is used to seal a diode substantially identical to the diode shown in FIG. 6a and the diode shown in FIG. 6b has the same reference characters as the diode shown in FIG. 6a. The split heating element 524 of 6b provides a completely uniform distribution of heat to the upper and lower seals due to the symmetry of the split heating element. The uniform distribution of heat substantially eliminates any temperature differential between the upper and lower seals. Although the split heating element of FIG. 6b provides a more uniform distribution of heat to the upper and lower seals than the split heating element of FIG. 6a, the split heating element of FIG. 6a has certain advantages in that it is easier to load than the heating element of FIG. 6b. The split heating element of FIG. 6b is more difficult to load since the diode protrudes from the lower plate member 528.

Figure 9:
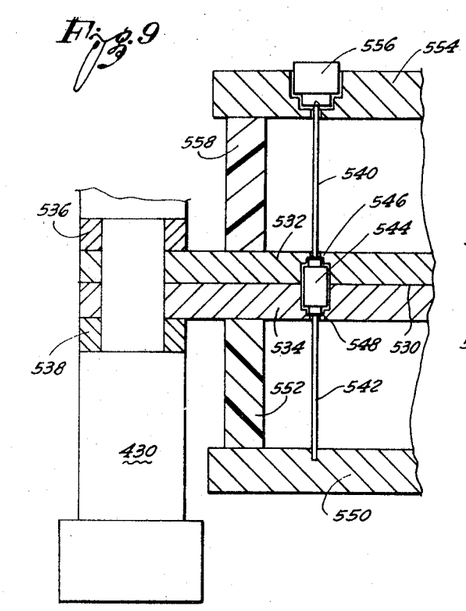
FIG. 9 is an illustration of a split heating element and associated hardware used to perform a brazing operation.
Figure 10:
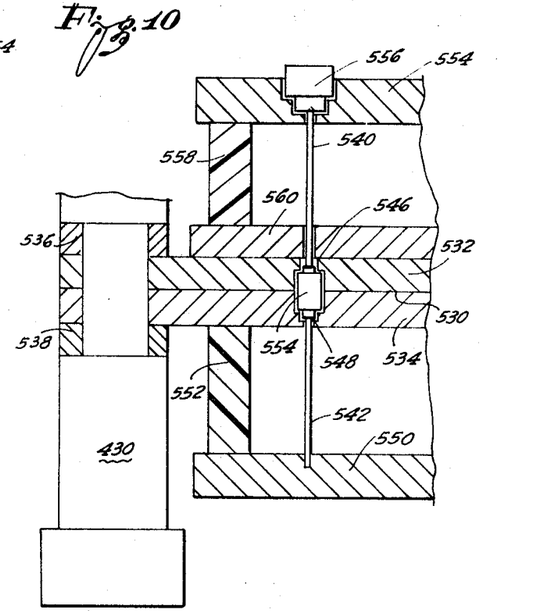
FIG. 10 is a modification of the split heating element of FIG. 9.

FIGS. 9 and 10 illustrate alternative forms for a split heating element and associated structure for use with the system of FIG. 6 so as to produce a brazing operation. In FIGS. 9 and 10 a split heating element 530 includes an upper plate 532 and a lower plate 534. Bus bars 536 and 538 are used to distribute the current from an electrode 430, which is given the same reference character and has substantially the same structure as electrode 430 of FIG. 6. A spring contact member would be used to provide good electrical contact between the electrode 430 and the split heating element 530. The spring contact member is now shown in FIG. 9 or FIG. 10 but would be similar to the spring contact member 442 shown in FIG. 6.

The split heating element 530 of FIGS. 9 and 10 is used to braze a pair of leads 540 and 542 to the studs of a previously sealed diode 544. A pair of solder preforms 546 and 548 are used to provide a brazing material between the studs of the diode 544 and the leads 540 and 542. A lower standoff 550 is maintained a particular distance from the heating element 530 by an insulating member 552. In FIGS. 9 and 10 an upper weight plate 554, including a plurality of weight elements 556, is maintained a particular distance from the heating element 530 by an insulating member 558. The lower standoff 550 and the upper weight plate 554 are both designed to receive and accurately position the leads 540 and 542. The upper weight plate 554, in addition, provides a downward pressure to insure a good brazing operation between the studs of the diode and the leads.

In the embodiment of FIG. 9, both the upper and lower members 532 and 534 of the heating element 530 are identical in structure. The components are loaded into the split heating element and associated structure as follows: The upper portion, including the upper member 532 and the weight plate 554 are both removed. The lead 542 is positioned between the lower standoff 550 and the lower member 534. The solder perform 548 is dropped into the opening in the lower member 534 and rests on the lead 542. The diode 544 is dropped into the opening in the lower member 534 and has the lower stud resting on the solder preform 548. The diode 544 now extends above the lower member 534. The upper member 532 is turned upside down and a solder preform 546 is dropped into the opening in the member 532. The solder preform is maintained in the opening in the member 532 using some means such as a vacuum plate and the member 532 is then turned over and positioned over the lower member 534. The solder preform 546 now rests on the upper stud of the diode 544. Finally, the upper lead 540 is positioned between the upper plate 532 and the weight plate 554 and the weight 556 is used to provide the downward pressure.

The embodiment of FIG. 10 includes an additional plate member 560 which is adapted to receive the upper lead 540. In the embodiment of FIG. 10, there is no need to use a loading device such as a vacuum plate to maintain the solder preform 546 in position, since the upper plate 532 has an opening large enough to receive the solder preform 546. The plate 560 provides the function of maintaining the upper lead 540 in the proper position. When current is applied to the split heating element 530 of either FIG. 9 or 10, the current flows down the split heating element to produce heat waves and produce sufficient infrared energy to braze the ends of the leads 540 and 542 to the stud portions of the diode 544. The use of a split heating element insures a uniform distribution of heat so as to substantially eliminate any temperature differential between the upper and lower brazing points.

Figure 11:
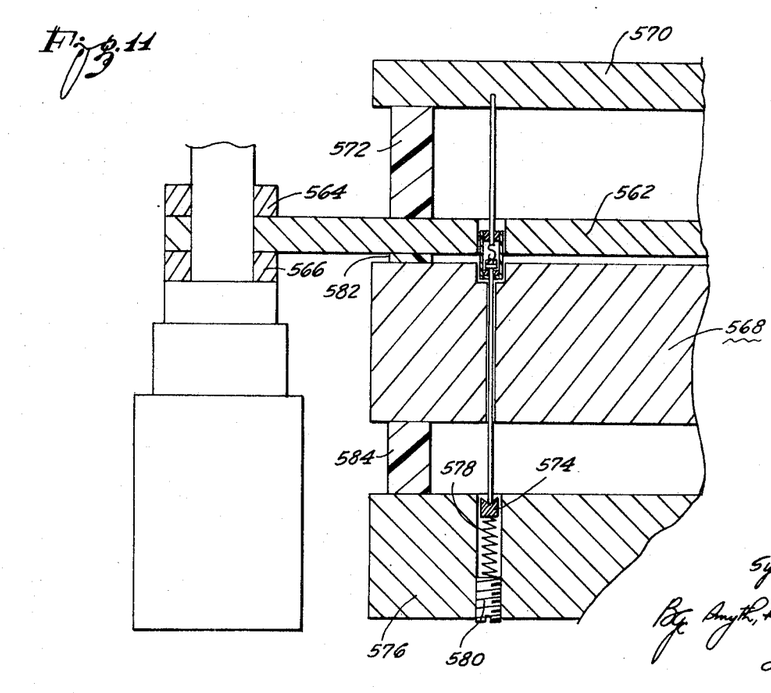
FIG. 11 is a modification of the heating element of FIG. 5.

In FIG. 11, a heating element 562 is shown for providing a seal in a diode which is substantially the same as the diode of FIG. 5. The embodiment of FIG. 11 is adapted for use with the system of FIG. 6 and includes bus bars 564 and 566 at the end of the heating element 562 to provide a uniform distribution of heat through the heating element. The heating element is electrically connected to the source of electrical energy using an electrode and spring contact member of FIG. 11 substantially the same as that shown in FIG. 6. In FIG. 11, the semiconductor portion of the diode is maintained below a particular temperature by the use of a heat sink 568. Also in FIG. 11 a good electrical contact is maintained in the diode by the use of an upward spring loading through the lower lead of the diode.

In FIG. 11 the upper lead of the diode is secured by an upper standoff plate 570. The standoff plate 570 is maintained an appropriate distance from the heating element 562 by an insulator 572. The lower lead of the diode is spring biased upward by a combination of a member 574 and a compression spring 578, both of which are disposed in an opening in a lower plate 576. The spring pressure produced by the spring 576 may be adjusted by a screw member 580. The heat sink 568 may reduce the temperature of the semiconductor material of the diode by either circulating a coolant, such as water or gas, through the heat sink 568, or by merely constructing the heat sink of a large quantity of a heat conducting material. The particular details of the heat sink are not shown and any conventional structure may be used. The heat sink 568 is maintained a proper distance from the heating element 562 and the lower plate member 576 by the use of insulating members 582 and 584.

Figure 12:
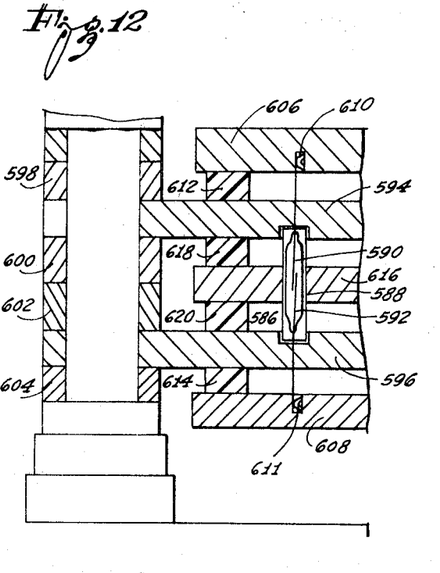
FIG. 12 illustrates a double heating element used to seal a reed switch.

In FIG. 12, another embodiment of the invention is shown wherein a double seal is provided in a reed switch 586. In FIG. 12, the reed switch 586 includes an outer glass tube 588 and a pair of magnetic reed members 590 and 592 which extend through the ends of the glass tube 588 and overlap each other for a small distance within the center of the tube. The reed switch 586 is operated by supplying a magnetic field to the reed switch so as to have the magnetic members 590 and 592 attract each other and produce a contact between the ends of the magnetic members 590 and 592. The double seal between the magnetic members 590 and 592 and the glass tube 588 is produced by a pair of heating elements 594 and 596. Bus bars 598 through 604 are used to provide the proper distribution of electrical current through the heating elements 594 and 596 and also to provide the proper spacing between heating elements 594 and 596.

Upper and lower standoffs 606 and 608 are used to provide the proper positioning of the magnetic reed members 590 and 592. The standoffs 606 and 608 receive the magnetic reed members 590 and 592 and may be provided with some means for gripping the magnetic reed members 590 and 592. The gripping may be accomplished by spring members 610 and 611 or by any other appropriate means. Insulators 612 and 614 maintain the standoffs 606 and 608 at a proper distance from heating elements 594 and 596. In addition, a heat sink 616 may be positioned by insulators 618 and 620 so as to maintain the middle portion of the reed switch 586 at a reduced temperature during the sealing operation. The reduction of the temperature may be desirable since the temperature needed to seal the magnetic members 590 and 592 to the glass tube 588 might alter the magnetic properties of the magnetic members 590 and 592. It is to be appreciated that an electrode structure and spring contact member similar to that shown in FIG. 6 may be used to electrically connect the heating elements of FIG. 12 to the source of electrical energy.

Figure 13:
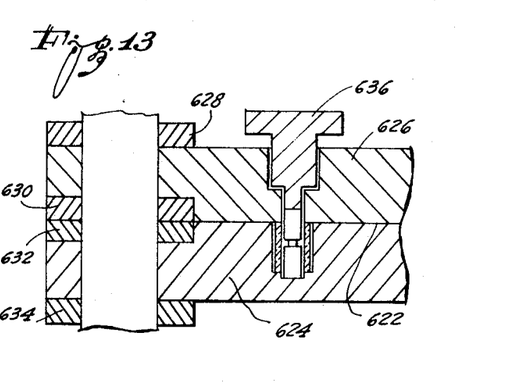
FIG. 13 illustrates a split heating element wherein one portion of the heating element is used as a weight plate.

FIG. 13 illustrates an embodiment of the invention used for providing a double seal in a diode similar to the diode shown in FIGS. 9 and 10. In FIG. 13, a split dual purpose heating element 622 has a lower plate 624 and an upper plate 626. Bus bars 628 through 634 are used to provide a uniform distribution of electrical current through the heating element 622. The upper plate 626 of the heating element 622 operates as part of the heating element and also as a weight plate. The upper plate 626 provides for a distribution of heat so that the temperature at both the upper and lower sealing points of the diode are the same.

The upper plate 626 also includes a weight member 636 which produces downward pressure on the upper stud member of the diode so as to insure a good electrical contact between the stud members and the semiconductor material contained within the diode. The provision of electrical current through the upper plate member 626 accomplishes a double function in the sealing apparatus of FIG. 13. First, the electrical current substantially eliminates any temperature differential between the upper and lower seals in the diodes so as to insure proper sealing. Second, as electric current is sent through the lower plate 624, the lower plate expands and the relative position between the diode and the weight 636 would be changed if current were not sent through the upper plate 626. Any relative movement between the weight 636 and the diode would produce unequal strains in the diode which may result in an improper seal. It is, therefore, desirable to equalize the movement of the weight and the diode by constructing the heating element as shown in FIG. 13 to allow current to flow through the upper member 626.

Figure 14:
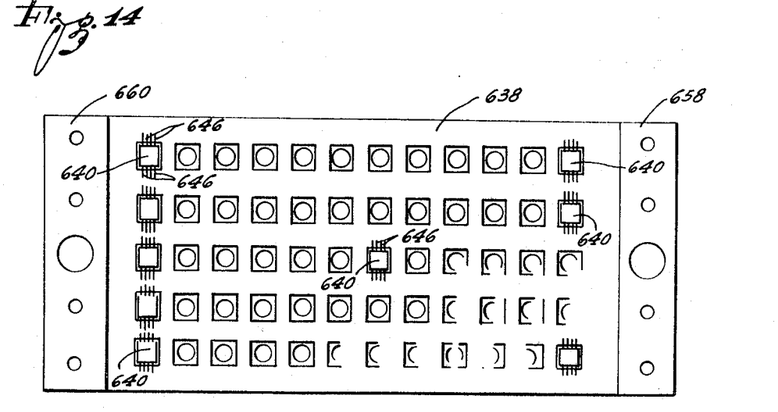
FIG. 14 illustrates a top view of a heating element used for sealing flat pack integrated circuits.
Figure 15:
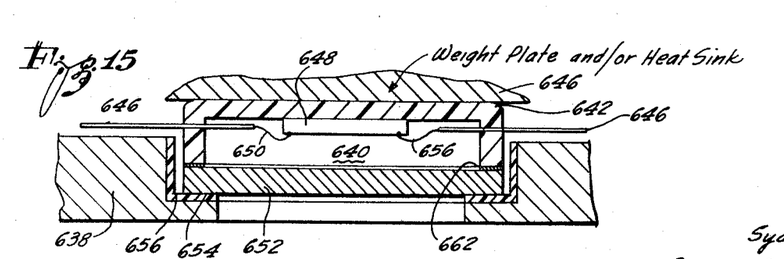
FIG. 15 illustrates a detailed cross-sectional side view of FIG. 14.

FIG. 14 illustrates a further modification of the invention wherein a heating element 638 is provided so as to produce a seal in a flat pack integrated circuit. FIG. 15 illustrates a side detail view of the heating element 638 and one flat pack integrated circuit 640.

The flat pack integrated circuit 640 includes a base member 642 which may be constructed of an insulating material. The base member 642 includes an upwardly extending wall portion 644 at the periphery of the base member 642 to produce an enclosed central area. Leads 646 are disposed through the wall 644 and project into the enclosed central area. Semiconductor material 648 is secured to the base member 642 and the semiconductor material may have an appropriate design so as to produce a particular circuit configuration. The lead members 646 are connected to particular portions of the semiconductor material 648 by thin wires 650.

The entire flat pack integrated circuit structure is to be sealed by a cover plate 652 which may be constructed of a metallic substance. Since the cover plate 652 is made of a metallic substance, the heating element 638 has openings 654 which are lined by an insulating material such as ceramic material 656. In FIG. 14, the heating element 638 is shown with bus bars 658 and 660 so as to provide a uniform distribution of the electrical current through the heating element 638. As current is passed through the heating element 638, heat at the upper end of the wall 644 melts the upper end of the wall to seal it to the cover member 652. If desired, sealing material 662 may be disposed between the wall member 644 and the cover 652 so as to insure a better seal.

During the sealing of the flat pack integrated circuit 640, it may be desirable to maintain the temperature of the semiconductor material 648 below a predetermined value so that the semiconductor material is not damaged. A combination weight plate and heat sink 664 may be used to conduct heat away from the semiconductor material 648. In addition, the combination weight plate and heat sink provides pressure on the flat pack integrated circuit so as to produce a good seal. The combination weight plate and heat sink 646 may be merely a heavy piece of metal or may be water cooled or gas cooled.

The present invention as described, in addition to the general areas of novelty, has many particular improvements which produce a uniform heating from the heating element so as to accomplish a particular operation. For example, the use of split heating elements substantially eliminates temperature differentials between spaced points in the individual devices which are being heated. Another improvement is in the use of a split heating element wherein one of the split members also operates as a weight plate so as to substantially eliminate relative movement between the weight elements and the individual devices which are being heated. An additional improvement is in the use of the bus bars on the heating elements so as to provide a uniform distribution of the current through the heating element.

Since the heating elements not only produce heat waves but also radiate infrared energy, the heating elements of the present invention may produce a seal at a lower temperature than prior art devices. The use of the infrared energy produces an increased efficiency in the sealing operation. An additional feature of the present invention is the use of a pressure differential at a particular time in the sealing cycle so as to squeeze the components to be sealed closely together to insure a tight seal.

The present invention is capable of many specific heating functions and is not to be limited to the specific embodiments shown in this application. Various modifications and adaptations of the invention are, therefore, possible and the invention is only to be limited by the appended claims.

What is claimed is:

1. Means for performing a heating operation on an individual device and where the individual device has a particular configuration and where the individual device includes portions to be heated, including
a heating element having a preformed area conforming to the particular configuration to receive the individual device and to surround the portions of the individual device to be heated,
a source of electrical energy, and
means operatively coupled to the source of electrical energy to supply electrical energy to the heating element for producing heat in the individual device at the portions to be heated and including a bus bar for providing a uniform distribution of the electrical energy to the heating element.

2. In a means for performing a heating operation on an individual device and where the individual device has a particular configuration and where the individual device includes portions to be heated and including a source of electrical energy,
a heating element operatively coupled to the source of electrical energy and having a preformed area conforming to the particular configuration to receive the individual device and to surround the portion of the individual device to be heated for producing heat in the portions of the individual device when electrical energy flows through the heating element, and
bus bar means coupled to the heating element for providing a uniform distribution of the electrical energy through the heating element.

3. Means for performing a sealing operation on a plurality of individual devices under particular atmospheric and pressure conditions wherein each device has at least two portions to be sealed together and where each of the individual devices has a particular configuration, including
an atmospheric chamber,
a heating element disposed within the atmospheric chamber and having a plurality of preformed areas and with each of the preformed areas conforming to the particular configuration to receive the individual device and to surround the portions of the individual device to be sealed together,
a source of electrical energy,
first means operatively coupled to the source of electrical energy to supply electrical energy to the heating element for producing heat in the individual devices at the portions of the individual devices to be sealed together, and
second means operatively coupled to the atmospheric chamber for controlling the atmosphere and pressure within the atmospheric chamber during the supply of electrical energy to the heating element and wherein the second means controls the atmospheric chamber to have a first pressure in the chamber when electrical energy is initially supplied to the heating element and to increase the pressure in the chamber after a particular period of time.

4. Means for performing a heating operation on an individual device under particular pressure conditions and where the individual device has a particular configuration and where the individual device includes portions to be heated, including
a pressure chamber,
a heating element disposed within the pressure chamber and having a preformed area conforming to the particular configuration to receive the individual device and to surround the portions of the individual device to be heated,
a source of electrical energy,
first means operatively coupled to the heating element and the source of electrical energy to supply electrical energy to the heating element for producing heat in the individual device at the portions to be heated, and
second means operatively coupled to the pressure chamber for producing a first pressure within the pressure chamber at a first particular time during the supply of electrical energy to the heating element and for producing a second pressure higher than the first within the pressure chamber at a second particular time during the supply of electrical energy to the heating element.

5. Means for performing a heating operation on an individual device and where the individual device has a particular configuration and where the individual device includes portions to be heated, including
a heating element having a preformed area conforming to the particular configuration to receive the individual device and to surround the portions of the individual device to be heated,
a source of electrical energy, and
spring contact means operatively coupled to the heating element and the source of electrical energy for spring loading the heating element to the source of electrical energy to supply electrical energy to the heating element for producing heat in the individual device at the portions to be heated.

6. Means for performing a heating operation on an individual device and where the individual device has a particular configuration and where the individual device includes portions to be heated, including
an atmospheric chamber including a door for sealing the chamber,
a heating element having a preformed area conforming to the particular configuration to receive the individual device and to surround the portions of the individual device to be heated,
a source of electrical energy, and
spring contact means operatively coupled to the heating element and the source of electrical energy and operatively coupled to but insulated from the door of the atmospheric chamber for spring loading the heating element to the source of electrical energy when the door of the atmospheric chamber is in the closed position.

7. Means for performing a heating operation on an individual device and where the individual device has a particular configuration and where the individual device includes portions to be heated, including
a heating element having a preformed area conforming to the particular configuration to receive the individual device and to surround the portions of the individual device to be heated,
a weight plate disposed above the heating element to provide a downward force on the individual device,
a source of electrical energy, and
means operatively coupled to the heating element, the weight plate and the source of electrical energy to supply electrical energy to the heating element and the weight for producing heat in the individual device at the portions to be heated.

8. In a means for performing a heating operation on an individual device and where the individual device has a particular configuration and where the individual device includes portions to be heated and including a source of electrical energy,
a heating element operatively coupled to the source of electrical energy and having a preformed area conforming to the particular configuration to receive the individual device and to surround the portions of the individual device to be heated for producing heat in the portions of the individual device to be heated when electrical energy flows through the heating element, and
a weight plate operatively coupled to the source of electrical energy disposed above the heating element to provide a downward force on the individual device.

9. Means for performing a heating operation on a plurality of individual devices and where each individual device has a particular configuration and where the individual devices include portions to be heated, including
a heating element having preformed areas conforming to the particular configuration to receive the individual devices and to surround the portions of the individual devices to be heated,
a source of electrical energy,
means operatively coupled to the heating element and the source of electrical energy to supply electrical energy to the heating element for producing heat in the individual devices at the portions to be heated, and
a heat sink operatively coupled to the individual devices and including preformed areas to surround the individual devices to provide a reduction in heat at selected portions of the individual devices while the heating element produces heat in the individual devices at the portions to be heated.

10. In a means for performing a heating operation on individual devices and where each individual device has a particular configuration and where the individual devices include portions to be heated and including a source of electrical energy,
a heating element operatively coupled to the source of electrical energy and having preformed areas conforming to the particular configuration to receive the individual devices and to surround the portions of the individual devices to be heated for producing heat in the portions of the individual device when electrical energy flows through the heating element, and
a heat sink operatively coupled to the individual devices and including preformed areas to surround the individual devices to provide a reduction in heat at selected portions of the individual devices while the heating element produces heat in the individual devices at the portions to be heated.

11. Means for sealing a plurality of individual devices at the same time wherein each one of the individual devices includes at least two portions to be sealed together and where the plurality of individual devices are arranged in a predetermned spatial pattern, including
a unitary plate element having preformed openings arranged in the predetermined spatial pattern to have each preformed opening at least partially surrounding the portions of the individual device to be sealed together,
a source of electrical energy,
means operatively coupled to the source of electrical energy to supply electrical energy to the plate element for producing heating energy from the plate element at each preformed opening to produce a seal between the two portions in each individual device, and
means provided at the ends of the unitary plate element to provide a uniform distribution of the electrical energy through the plate element.

12. The combination of claim 11 wherein the unitary plate element is composed of graphite.

13. The combination of claim 11 wherein the unitary plate element substantially encloses the individual devices.

14. In a means for sealing a plurality of individual devices at the same time and where each one of the individual devices includes at least two portions to be sealed together and including a source of electrical energy and where the plurality of individual devices are arranged in a predetermined spatial pattern,
a unitary plate element operatively coupled to the source of electrical energy and having a plurality of preformed openings arranged in the predetermined spatial pattern to have each preformed opening at least partially surrounding the portions of an individual device to be sealed together to produce heating energy at each preformed opening to produce a seal between the two portions of the individual devices when electrical energy flows through the plate element, and
means provided at the ends of the unitary plate element to provide a uniform distribution of electrical current through the plate element.

15. The apparatus of claim 14 wherein the unitary plate element is composed of graphite.

16. The apparatus of claim 14 wherein the unitary plate element substantially encloses the individual devices.

17. Means for producing a plurality of seals in diodes at the same time and where the plurality of diodes are arranged in a predetermined spatial pattern and where individual diodes have a tubular body with lead elements extending from opposite ends of the tubular body, including
a heating element having preformed openings arranged in the predetermined spatial pattern to have each preformed opening surrounding the tubular body of the diode adjacent to at least one lead element,
a source of electrical current, and
means operatively coupled to the heating element and the source of electrical current to supply electrical current to the heating element for producing heat from the heating element at each preformed opening to seal the lead element to the tubular body of the diode.

18. The combination of claim 17 wherein the entire length of the tubular bodies of the individual diodes is surrounded by the preformed opening to seal lead elements at both ends of the tubular bodies of the diodes.

19. The combination of claim 17 wherein the heating element is split into two pieces and with each piece of the heating element surrounding a portion of the length of the individual diodes so as to substantially enclose the diodes and seal lead elements at both ends of the tubular bodies of the diodes.

20. In a means for producing a seal in a plurality of diodes at the same time and including a source of electrical current and where the plurality of diodes are arranged in a predetermined spatial pattern and where individual diodes have a tubular body with lead elements extending from opposite ends of the tubular body,
a unitary element heating element operatively coupled to the source of electrical current and having a plurality of preformed openings arranged in the predetermined spatial pattern to have each preformed opening surrounding the tubular body of the diode adjacent to at least one lead element to produce heat at each preformed opening to seal the lead element to the tubular body of the diode when electrical current flows through the heating element.

21. The apparatus of claim 20 wherein the entire length of the tubular bodies of the individual diodes is surrounded by the preformed opening to seal lead elements at both ends of the tubular bodies of the diodes.

22. The apparatus of claim 20 wherein the heating element is split into two pieces and with each piece of the heating element surrounding a portion of the length of the individual diodes so as to substantially enclose the diodes and seal lead elements at both ends of the tubular bodies of the diodes.

23. Means for heating a plurality of individual devices at the same time and where the plurality of individual devices have first and second ends, including
a work holder supporting the plurality of individual devices by the first ends in a predetermined spatial pattern,
a heating element adjacent the work holder having preformed areas arranged in the predetermined spatial pattern to have each preformed area adjacent to the second end of an individual device,
a source of electrical current,
means operatively coupled to the heating element and the source of electrical current to supply electrical current to the heating element for producing heating energy from the heating element at each preformed area to produce heat at the second end of each individual device.

24. The combination of claim 23 wherein the work holder is movable relative to the heating element.

References Cited

UNITED STATES PATENTS

| | | | |
|---|---|---|---|
| 1,691,562 | 11/1928 | Bissell | 219—157 X |
| 2,001,538 | 5/1935 | Mueller et al. | 219—225 X |
| 2,447,960 | 8/1948 | Ricketts et al. | 219—225 X |
| 2,537,289 | 1/1951 | Van Embden | 210—10.79 X |
| 2,736,847 | 2/1956 | Barnes. | |
| 2,813,191 | 11/1957 | Gray | 219—85 |
| 3,030,704 | 4/1962 | Hall | 29—498 X |
| 3,031,561 | 4/1962 | Shaffer | 18—36 |
| 3,189,494 | 6/1965 | Short. | |
| 3,220,380 | 11/1965 | Schaarschmidt. | |
| 3,271,208 | 9/1966 | Allegretti. | |

JOSEPH V. TRUHE, Primary Examiner